(12) United States Patent
Bridges

(10) Patent No.: US 9,110,758 B2
(45) Date of Patent: Aug. 18, 2015

(54) CROSS-PLATFORM SOFTWARE FRAMEWORK FOR EMBEDDED SYSTEMS ON DATA STORAGE DEVICE

(71) Applicant: Western Digital Technologies, Inc., Irvine, CA (US)

(72) Inventor: Dick Bridges, Yorba Linda, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 78 days.

(21) Appl. No.: 13/925,697

(22) Filed: Jun. 24, 2013

(65) Prior Publication Data

US 2014/0304716 A1 Oct. 9, 2014

Related U.S. Application Data

(60) Provisional application No. 61/798,362, filed on Mar. 15, 2013.

(51) Int. Cl.
G06F 9/45 (2006.01)
G06F 9/445 (2006.01)
G06F 9/455 (2006.01)

(52) U.S. Cl.
CPC .............. *G06F 8/65* (2013.01); *G06F 9/44526* (2013.01); *G06F 9/44542* (2013.01); *G06F 9/45504* (2013.01)

(58) Field of Classification Search
USPC .................. 717/139–143, 145–148, 150–152
IPC ................................ G06F 8/40,8/41, 8/52, 8/53
See application file for complete search history.

(56) References Cited

U.S. PATENT DOCUMENTS

| | | | |
|---|---|---|---|
| 6,256,784 B1* | 7/2001 | Grove | 717/139 |
| 6,499,054 B1 | 12/2002 | Hesselink et al. | |
| 6,578,193 B1* | 6/2003 | Adams | 717/139 |
| 6,732,158 B1 | 5/2004 | Hesselink et al. | |
| 6,820,255 B2* | 11/2004 | Babaian et al. | 717/151 |
| 6,836,796 B2 | 12/2004 | Schwartz et al. | |
| 6,968,546 B2* | 11/2005 | Lueh | 717/158 |
| 6,973,649 B1* | 12/2005 | Pazel | 718/100 |
| 7,032,216 B1* | 4/2006 | Nizhegorodov | 717/152 |
| 7,120,692 B2 | 10/2006 | Hesselink et al. | |
| 7,181,732 B2* | 2/2007 | Bak et al. | 717/140 |
| 7,246,350 B2 | 7/2007 | Vu | |
| 7,313,789 B1* | 12/2007 | Yellin et al. | 717/151 |
| 7,316,010 B1* | 1/2008 | Daynes et al. | 717/140 |
| 7,337,436 B2* | 2/2008 | Chu et al. | 717/140 |
| 7,346,897 B2* | 3/2008 | Vargas | 717/137 |
| 7,426,721 B1* | 9/2008 | Saulpaugh et al. | 717/144 |

(Continued)

OTHER PUBLICATIONS

Gulwani et al, "Program Verification as Probabilistic Inference", ACM, pp. 277-289, 2007.*

(Continued)

*Primary Examiner* — Anil Khatri

(57) ABSTRACT

The embodiments of present invention relates to methods and systems for a cross-platform framework for embedded systems. One embodiment provides a framework for a network attached storage or other storage devices. The framework provides a standardized structure for modules of software, such as plugins, to implement various features on the embedded system. In addition, the framework supports interoperability between software modules written in either native code, such as C, C++, and interpreted code, such as JAVA™.

14 Claims, 14 Drawing Sheets

(56) References Cited

U.S. PATENT DOCUMENTS

| | | | |
|---|---|---|---|
| 7,444,624 B2 * | 10/2008 | Tarkkala | 717/139 |
| 7,454,443 B2 | 11/2008 | Ram et al. | |
| 7,467,187 B2 | 12/2008 | Hesselink et al. | |
| 7,509,638 B2 | 3/2009 | Backhouse et al. | |
| 7,519,976 B2 | 4/2009 | Blevins | |
| 7,546,353 B2 | 6/2009 | Hesselink et al. | |
| 7,546,576 B2 | 6/2009 | Egli | |
| 7,587,467 B2 | 9/2009 | Hesselink et al. | |
| 7,600,036 B2 | 10/2009 | Hesselink et al. | |
| 7,626,931 B2 | 12/2009 | Wu et al. | |
| 7,730,542 B2 * | 6/2010 | Cronce et al. | 726/26 |
| 7,774,477 B2 | 8/2010 | Zintel et al. | |
| 7,788,404 B2 | 8/2010 | Hesselink et al. | |
| 7,853,934 B2 * | 12/2010 | Partamian | 717/140 |
| 7,917,628 B2 | 3/2011 | Hesselink et al. | |
| 7,934,251 B2 | 4/2011 | Hesselink et al. | |
| 7,949,564 B1 | 5/2011 | Hughes et al. | |
| 8,004,791 B2 | 8/2011 | Szeremeta et al. | |
| 8,126,957 B2 | 2/2012 | Gowen et al. | |
| 8,136,100 B1 * | 3/2012 | Goldman | 717/136 |
| 8,255,661 B2 | 8/2012 | Karr et al. | |
| 8,271,995 B1 | 9/2012 | Papakipos et al. | |
| 8,281,291 B2 * | 10/2012 | Dmitrovich et al. | 717/148 |
| 8,285,965 B2 | 10/2012 | Karr et al. | |
| 8,341,117 B2 | 12/2012 | Ram et al. | |
| 8,341,275 B1 | 12/2012 | Hesselink et al. | |
| 8,352,567 B2 | 1/2013 | Hesselink et al. | |
| 8,365,155 B2 * | 1/2013 | Rioux | 717/143 |
| 8,370,818 B2 * | 2/2013 | Osminer et al. | 717/140 |
| 8,526,798 B2 | 9/2013 | Hesselink | |
| 8,631,284 B2 | 1/2014 | Stevens | |
| 8,646,054 B1 | 2/2014 | Karr et al. | |
| 8,661,507 B1 | 2/2014 | Hesselink et al. | |
| 8,688,797 B2 | 4/2014 | Hesselink et al. | |
| 8,713,265 B1 | 4/2014 | Rutledge | |
| 8,762,682 B1 | 6/2014 | Stevens | |
| 8,780,004 B1 | 7/2014 | Chin | |
| 8,793,374 B2 | 7/2014 | Hesselink et al. | |
| 8,819,443 B2 | 8/2014 | Lin | |
| 8,819,649 B2 * | 8/2014 | Lafreniere et al. | 717/139 |
| 2003/0110312 A1 | 6/2003 | Gunduc et al. | |
| 2004/0194059 A1 | 9/2004 | Akella et al. | |
| 2005/0033751 A1 | 2/2005 | Maron | |
| 2005/0144195 A1 | 6/2005 | Hesselink et al. | |
| 2005/0144200 A1 | 6/2005 | Hesselink et al. | |
| 2009/0327996 A1 | 12/2009 | Siegemund et al. | |
| 2010/0121893 A1 | 5/2010 | Uhrhane et al. | |
| 2010/0290424 A1 | 11/2010 | Collingrige | |
| 2011/0060790 A1 | 3/2011 | Subramanian et al. | |
| 2012/0036041 A1 | 2/2012 | Hesselink | |
| 2012/0041991 A1 | 2/2012 | Shrufi et al. | |
| 2013/0183935 A1 | 7/2013 | Holostov et al. | |
| 2013/0212401 A1 | 8/2013 | Lin | |
| 2013/0266137 A1 | 10/2013 | Blankenbeckler et al. | |
| 2013/0268749 A1 | 10/2013 | Blankenbeckler et al. | |
| 2013/0268759 A1 | 10/2013 | Blankenbeckler et al. | |
| 2013/0268771 A1 | 10/2013 | Blankenbeckler et al. | |
| 2014/0095439 A1 | 4/2014 | Ram | |
| 2014/0169921 A1 | 6/2014 | Carey | |
| 2014/0173215 A1 | 6/2014 | Lin et al. | |

OTHER PUBLICATIONS

Sullivan et al, "Dynamic Native Optimization of Interpreters", ACM, pp. 50-57, 2003.*
Savrun-Yeniceri et al "Efficient Hosted Interpreters on the JVM", ACM Transactions on Architecture and Code Optimization, vol. 11, No. 1, Article 9, pp. 1-24, 2014.*
Casey et al, "Optimizing Indirect Branch Prediction Accuracy in Virtual Machine Interpreters", ACM Transactions on Programming Languages and Systems, vol. 29, No. 6, Article 37, pp. 1-36, 2007.*
Ortiz, "Language Design and Implementation using Ruby and the Interpreter Pattern", ACM, pp. 48-52, 2008.*
Mittra, "VIP : A Verilog Interpreter for Preprocessing", IEEE, pp. 34-38, 1996.*
Notification of Trans. of The International Search Report and Written Opinion dated Jul. 31, 2014 for related PCT Application No. PCT/US2014/029839, pp. 1-11.

* cited by examiner

CROSS-PLATFORM SOFTWARE FRAMEWORK FOR EMBEDDED SYSTEMS ON DATA STORAGE DEVICE

CROSS REFERENCE TO RELATED APPLICATIONS

This application claims priority to U.S. Provisional Application No. 61/798,362, entitled "SOFTWARE FRAMEWORK FOR A STORAGE DEVICE," filed Mar. 15, 2013, which is herein incorporated by reference in its entirety.

BACKGROUND

On embedded, and thus, resource-limited devices, updating to add new functionality and bug fixing becomes more and more necessary. Typically, a storage device, such as a network-attached storage (NAS), is constructed as a specialized computer or appliance. Normally, such devices use low-power hardware and having an embedded operating system, such as LINUX™, that is configured specifically as a storage device.

Today, due to their increasing complexity, storage devices now run software to implement their various features and manage their interactions with other devices. Unfortunately, the software for each storage device is custom built and integrated into a single package with the operating system. This form of software development is difficult and often results in bugs, etc.

BRIEF DESCRIPTION OF THE DRAWINGS

Systems and methods which embody the various features of the invention will now be described with reference to the following drawings, in which.

DETAILED DESCRIPTION

Figure 1:
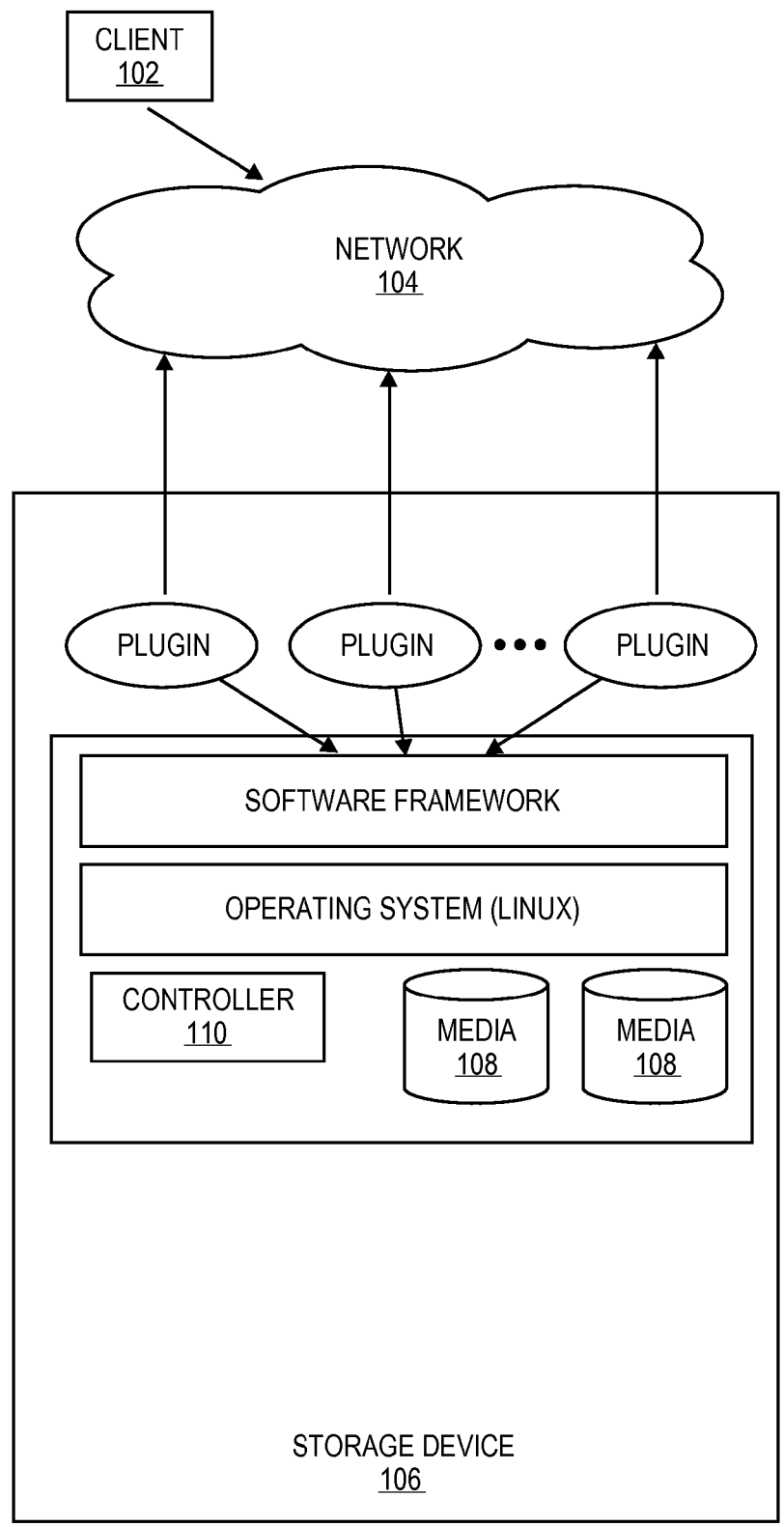
FIG. 1 illustrates an exemplary data storage device that has been configured as a network attached storage system to illustrate an implementation of an embodiment of the present invention.

The current software architecture used in embedded devices makes it difficult for developers and vendors to write applications that interact in a consistent manner with other applications, for example, running on a storage device. It is also difficult for developers and vendors to write applications in different languages and update the program code. Accordingly it would be desirable to provide a different architecture for embedded devices, especially storage devices.

The embodiments relate to methods and systems for a cross-platform framework for embedded systems. The framework implements a plugin architecture that can be implemented on a variety of platforms, including embedded devices such as storage devices. The framework enables creation of components for applications in a modular fashion that can be assembled together and upgraded incrementally in whole or in part. One embodiment provides a framework for a network attached storage or other storage devices. The framework provides a standardized structure for modules of software, such as plugins, to implement various features on the embedded system. In some embodiments, the framework is based on native code that is compiled to run the embedded device, and thus, can support virtually any programming language used to write applications and plugins for the framework. In addition, the framework supports interoperability between software modules written in either native code, such as C++, and various clients. In some embodiments, the framework may support applications and plugins written in interpreted code, such as JAVA™ clients or plugins.

The framework provides an abstraction layer and makes code running on an embedded device, such as a storage device, modular and configurable. Thus, various embedded device products can be configurable with different features. In some embodiments, the framework also modifies which plugins are served.

A consistent programming model provided by the framework helps bundle developers cope with scalability issues in many different dimensions. The framework may run on a variety of devices whose differing hardware characteristics may affect many aspects of a service implementation. Consistent interfaces provided by the framework can ensure that the software components supported by the framework can be mixed and matched and still result in stable systems.

For example, the framework allows bundles to select an available implementation at run-time through the framework service registry. Bundles may register new services, receive notifications about the state of services, or look up existing services to adapt to the current capabilities of the device. This aspect of the framework makes an installed bundle extensible after deployment: that is, new bundles can be installed for added features or existing bundles can be modified and updated without requiring the system to be restarted.

In one embodiment, the framework is implemented using native program code, such as C++. The native implementation of the framework provides several advantages. Dynamic loading of modules may be implemented with standard mechanisms. Dependencies between modules can be resolved when they are loaded. The framework can also provide significant advantages regarding performance and memory requirements. Some embodiments use open standards and execution of native binary code and are capable of running on any standard Portable Operating System Interface (POSIX) system.

The embodiments enable dynamic loading of code at runtime on the basis of shared object files and control the visibility of code modules (e.g. import/export-packages). The framework provides a mechanism to load different versions of the same package and, if desired, supports object-oriented code as well as different file formats, such as the JAVA™ Archive File Format (JAR) to package and deploy bundles. In some embodiments, the framework allows updates of bundles at runtime.

Furthermore, the embodiments provide functionality of a life-cycle layer (e.g. resolve/start/stop/update), a service layer (i.e. services, service listeners, filters), and support for various devices to participate in software-defined storage.

In one embodiment, the framework of the present invention provides an asynchronous, event-driven, message-passing, framework that implements a plugin architecture suitable for use across platforms and product lines. It enables the creation of components developed along the lines of a software factory that produces software parts engineered for assembly into products as well as upgrades to, and future versions of, existing products.

Certain embodiments of the inventions will now be described. These embodiments are presented by way of example only, and are not intended to limit the scope of the inventions. Indeed, the novel methods and systems described herein may be embodied in a variety of other forms. Furthermore, various omissions, substitutions and changes in the form of the methods and systems described herein may be made without departing from the spirit of the inventions. To illustrate some of the embodiments, reference will now be made to the figures.

FIG. 1 shows a system 100 in which the embodiments may be implemented. For purposes of illustration, an exemplary framework is shown implemented on a network attached storage (NAS). However, those skilled in the art will recognize that any type of embedded device or device capable of running a framework are within the principles of the present invention.

As shown, the system 100 may comprise a client or host device 102, a network 104, and a storage device 106. The storage device 106 may be implemented as a NAS device having a plurality of storage media 108. These components will now be further described.

Host device 102 refers to any computing device used to access files shared by storage device 106. For example, the host device 102 may be a personal computer, a laptop computer, a tablet computer, a mobile phone, etc. Such devices are well known to those skilled in the art.

Network 104 provides a communications infrastructure for communications between the host device 102 and the storage device 106. Network 104 may comprise various components and network elements, such as routers, switches, hubs, etc.

The network 104 may support various communications protocols, such as Ethernet, Internet protocols, etc. In addition, the network 104 may be implemented as a wired or wireless network or a combination thereof.

Storage device 106 refers to any data storage device capable of providing or sharing access to a file. Storage device 106 may be implemented as a hard disk drive, a solid-state drive, a hybrid drive, a direct attached storage device, etc.

In the present disclosure, by way of example, storage device 106 is implemented as a NAS device. As a NAS device, storage device 106 provides file level access and shares files with host device 102 over network 104. The storage device 106 may be implemented using known hardware, firmware, and software. For example, as a NAS device, the storage device 106 may be implemented as a specialized computer or appliance configured to store and serve files over the network 104. In some embodiments, the storage device 106 comprises a processor, such as an ARM, PowerPC, or MIPS processor.

Storage media 108 refers to the medium on which the storage device 106 stores data. For example, storage media 108 may comprise disks or magnetic media, solid-state memory, optical media, etc. As shown, the storage device 106 may comprise multiple storage media 108 for purposes of capacity and redundancy. For example, as a NAS device, the storage device 106 may support various RAID levels.

Controller 110 represents the hardware and software that controls the operations of the storage device. In some embodiments, the controller 110 may also comprise one or more other components to supplement its operations, such as an on-chip RAID controller, a memory or disk cache, etc. As will be described further below, the controller 110 may execute an operating system 112 and a framework 114.

Operating system 112 represents the software executed by the controller 110 to manage the hardware resources and provide various services, such as web services, for applications running on the storage device 106. The controller 110 may support a variety of operating systems, such as UNIX™, LINUX™, Windows, and the like, which are known to those skilled in the art. For example, in one embodiment, the controller 110 may run based on an operating system, such as PLAN 9™, UNIX™, LINUX™, and the like.

In addition, in one embodiment, the storage device 106 comprises a framework 114 that provides a standardized structure for modules of software, such as plugins, to implement various features on the storage device 106. In some embodiments, the framework is implemented with native code, such as C++, and thus, can support virtually any programming language. In addition, the framework supports interoperability between software modules written in either native code, such as C++, and interpreted code, such as JAVA™ For example, in one embodiment, a JAVA™ Runtime Environment ("JRE") may be installed on the storage device 106 and execute on the framework 114 to support JAVA™-based software and plugins.

The embodiments provide a framework 114 that can run on any standard POSIX-compliant operating system, such as LINUX™ The embodiments use shared objects to provide software modularity. For example, each package (i.e., C++ namespace) can be represented by a shared object file in the Executable and Linking Format or Executable and Linkable Format ('ELF'). This allows implementing the dynamic import and export of packages between bundles at runtime with standard dlopen and ELF mechanisms. In some embodiments, the framework 114 may support other types of file formats, such as Common Object File Format ("COFF"), Win32, Object Module Format ("OMF"), etc.

Bundles can be implemented as ZIP-archives containing a standardized manifest and shared object files representing packages. Without any imports in the manifest, shared objects of different bundles may be isolated from each other.

To establish visibility between shared objects, the runtime system of the framework 114 adds ELF dependencies to the shared object files after resolving available packages according to specified imports. Thus, in some embodiments, code-sharing functionality is provided by standard ELF mechanisms, which are highly mature.

Moreover, the embodiments of the framework 114 provide life-cycle layer functionality (e.g., starting, updating and stopping of bundles). For example, the framework 114 may implement a service layer with a service registry including support for RFC1960-compliant filters. Finally, the embodiments support an event and listener concept by offering framework, bundle and service listeners.

In one embodiment, the framework 114 employs a message passing interface. For example, the framework 114 may employ the BOOST.MPI library. The BOOST.MPI may serve as a wrapper for the message passing interface (MPI). The Boost.MPI is a library for message passing in high-performance parallel applications. A Boost.MPI program is one or more processes that can communicate either via sending and receiving individual messages (point-to-point communication) or by coordinating as a group (collective communication). Unlike communication in threaded environments or using a shared-memory library. Boost.MPI processes can be spread across many different machines, possibly with different operating systems and underlying architectures.

Boost.MPI is a C++-friendly interface to the standard Message Passing Interface (MPI), the most popular library interface for high-performance, distributed computing. MPI defines a library interface, available from C, Fortran, and C++, for which there are many MPI implementations.

The Boost.MPI library provides an alternative C++ interface to MPI that better supports modern C++ development styles, including complete support for user-defined data types and C++ Standard Library types, arbitrary function objects for collective algorithms, and the use of modern C++ library techniques to maintain maximal efficiency.

In one embodiment, the Boost.MPI is configured to support the functionality in MPI 1.1. The abstractions in Boost.MPI allow calls to the underlying C MPI library.

For example, in one embodiment, the Boost.MPI is used to support:

Communicators: Boost.MPI supports the creation, destruction, cloning, and splitting of MPI communicators, along with manipulation of process groups.

Point-to-point communication: Boost.MPI supports point-to-point communication of primitive and user-defined data types with send and receive operations, with blocking and non-blocking interfaces.

Collective communication: Boost.MPI supports collective operations such as reduce and gather with both built-in and user-defined data types and function objects.

MPI Datatypes: Boost.MPI can build MPI data types for user-defined types using, for example, the Boost.Serialization library.

Separating structure from content: Boost.MPI can transfer the shape (or "skeleton") of complex data structures (lists, maps, etc.) and then separately transfer their content. This facility optimizes for cases where the data within a large, static data structure needs to be transmitted many times.

In the embodiments, Boost.MPI can be accessed either through its native C++ bindings, or through an alternative, such as a PYTHON™ interface. In another embodiment, the framework 114 may utilize a communications protocol, such as 9P provided by a PLAN 9™ operating system.

The framework 114 provides a general-purpose, secure, and managed framework that supports the deployment of extensible and down-loadable applications known as bundles. The framework 114 manages the installation and update of bundles in a dynamic and scalable fashion. To achieve this, it manages the dependencies between bundles and services in detail. It provides the bundle developer with the resources necessary to take advantage of the platform independence and dynamic code-loading capability in order to easily develop services for small-memory devices that can be deployed on a large scale.

In one embodiment, the framework 114 enables the storage device 106 to support and implement software-defined storage. In particular, the framework 114 provides a platform by which the storage device 106 may virtualize its storage capacity and a communications protocol by which to establish virtualized storage on the storage device 106 alone or in cooperation with other storage devices (not shown). For example, the framework 114 may serve as a platform running on the storage device 106 to deliver block and file storage services. In one embodiment, the framework 114 provides an abstraction layer for the underlying hardware of the storage device 106. Furthermore, the framework 114 may provide one or more APIs for various storage management functions, such as volume management, storage provisioning services, RAID configuration, etc.

Figure 1A:
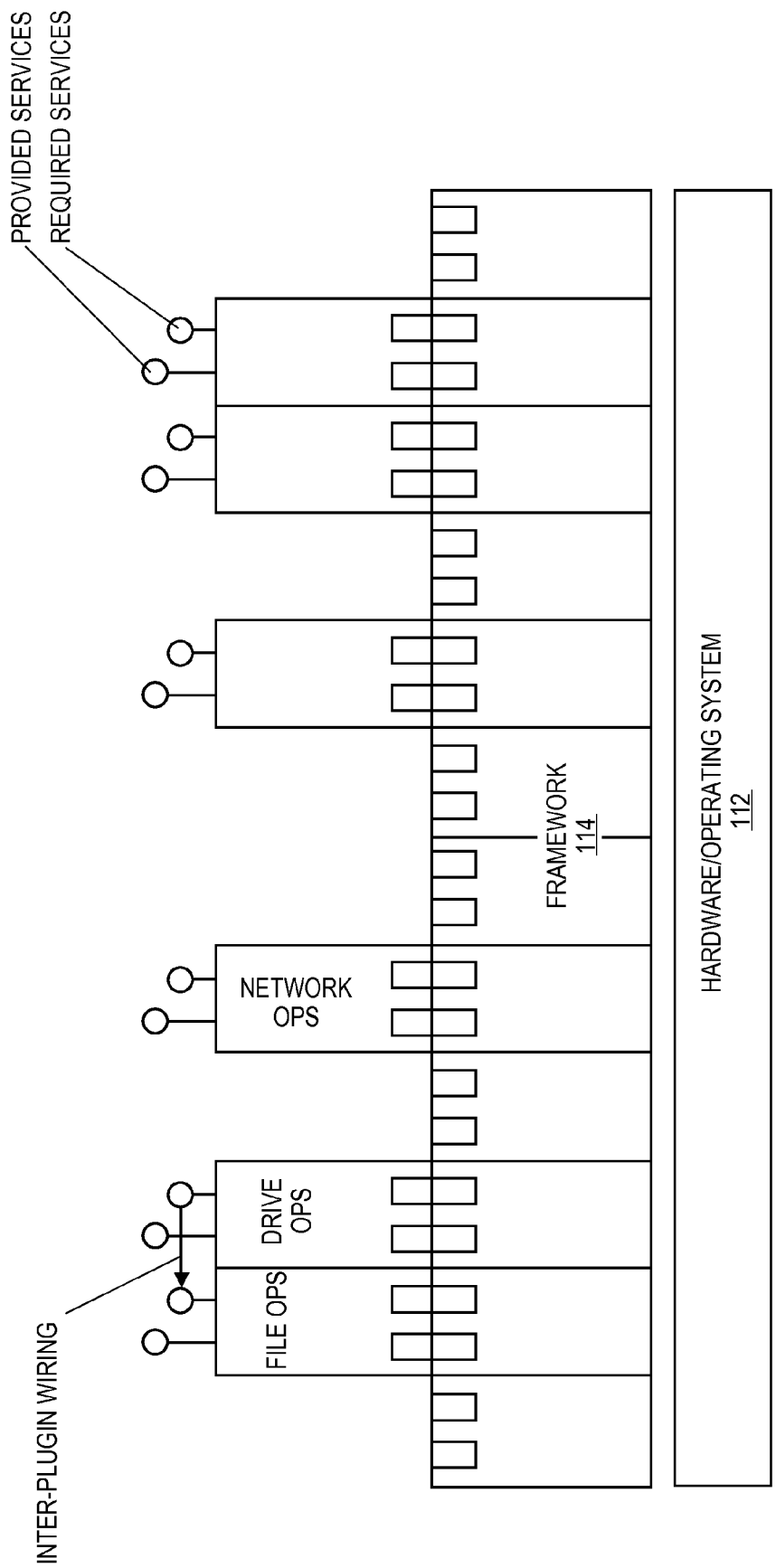
FIG. 1A illustrates an exemplary deployment of a framework in accordance with an embodiment of the present invention.

FIG. 1A illustrates an exemplary deployment implementation of the framework 114. The framework 114 uses bundles to deploy one or more services. Bundles contain the libraries, resources and additionally a manifest file describing the content of the bundle. In C, libraries contain only the Objects compiled out of the source. In the prior art, it is not possible to add resources and the manifest. Accordingly, in the embodiments, a zip file is used in which the library and resources are packed.

Figure 2:
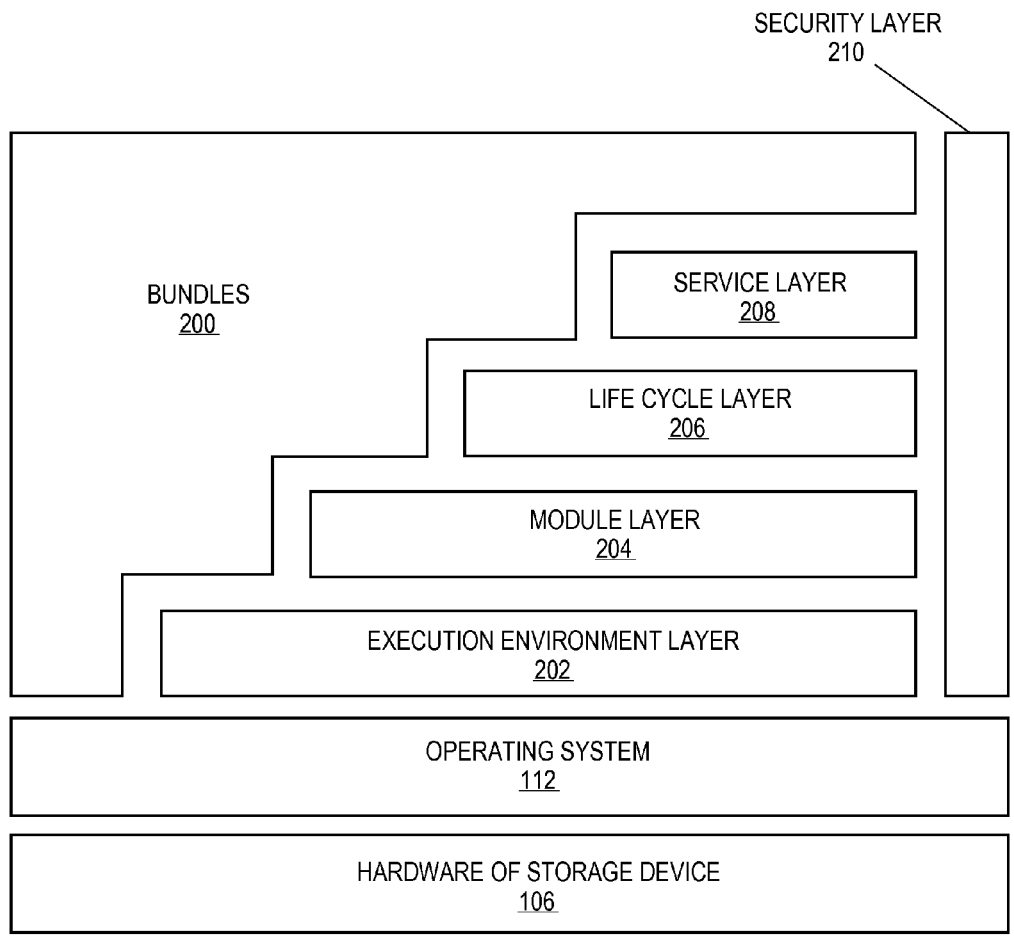
FIG. 2 illustrates an exemplary architecture of the framework in accordance with an embodiment of the present invention.

FIG. 2 illustrates an exemplary architecture of the framework 114. As shown, the framework 114 may comprise the following layers: a bundles layer 200, an execution environment layer 202, a module layer 204, a life cycle layer 206, a service layer 208, and a security layer 210. These components of the framework 114 will now be further described.

The bundles in bundle layer 200 provide the program code for the plugins requesting various services of the framework 114 and other plugins. In the embodiments, the framework 114 defines a unit of modularization, called a bundle. A bundle is comprised of binaries and other resources, which together can provide functions to end users. Bundles can share bundle capabilities and bundle requirements in a well-defined way. Thus, in the framework 114, bundles are the entities for deploying applications.

As noted, a bundle may be deployed as a ZIP file. ZIP files are used to store applications and their resources in a standard ZIP-based file format. A bundle is a ZIP file that contains the resources necessary to provide some functionality. These resources may be HTML files, help files, icons, etc.

The bundle may also contain a manifest file describing the contents of the ZIP file and providing information about the bundle. This file uses headers to specify information that the framework 114 uses to correctly activate a bundle. For example, it states dependencies on other resources that must be available to the bundle before it can run.

Once a bundle is started, its functionality is provided and services are exported to other bundles installed in the framework 114. The bundle may comprise various components to determine how the bundle executes. For example, a bundle-activation policy specifies how the framework should activate the bundle once started. Some embodiments of possible headers are described in the following descriptions below. A bundle-activator header specifies the name of the class used to start and stop the bundle. A bundle header may hold a comma-separated list of category names.

Another header defines a comma-separated list of ZIP file path names or directories inside the bundle containing classes and resources. A version header defines that the bundle has been released according to a serialized version. A native code header contains a specification of native code libraries contained in this bundle.

A symbolic name header specifies a non-localizable name for this bundle. The bundle symbolic name together with a version that identifies a unique bundle though it can be installed multiple times in a framework.

An update header specifies a URL where an update for this bundle is available, for example, in the form of a ZIP file. A dynamic import-package header contains a comma-separated list of package names that should be dynamically imported when needed.

An export-Package header contains a declaration of exported packages. A require-bundle header specifies that all exported packages from another bundle must be imported, effectively requiring the public interface of another bundle. A require-capability header specifies that a bundle requires other bundles to provide a capability.

In one embodiment, the execution environment layer 202 establishes the execution environment for running the bundles 200.

In one embodiment, the module layer 204 defines the modularization model. It may have strict rules for sharing between bundles or hiding packages from other bundles. In the module layer 204, since bundles depend on one or more external entities. A bundle can require other bundles, an execution environment, a specific window system, a DLL or shared library, an extender, a specific peripheral, etc. Once a bundle starts, it assumes that those dependencies are satisfied. Bundles can express their external dependencies via requirements on capabilities that are provided by the run-time environment or other bundles. For example, BOOST provides an easy to use interface, such as MPI 1.1 and provides the ability to use any version.

Capabilities are attribute sets in a specific name space and requirements are filter expressions that assert the attributes of the capabilities of their corresponding name space. A requirement is satisfied when there is at least one capability that matches the filter. A name space also provides the semantics of matching a requirement to a capability. Bundles can only provide their capabilities when their requirements are satisfied, that is, requirements are transitive.

In one embodiment, the life cycle layer 206 provides a life cycle interface, such as an application programming interface (API) to bundles such as the bundles in bundle layer 200. This API provides a runtime model for bundles. It defines how bundles are started and stopped as well as how bundles are installed, updated and uninstalled. Additionally, it provides a comprehensive event API to allow a management bundle to control the operations of the service platform.

In one embodiment, the service layer 208 provides a dynamic, concise and consistent programming model for bundle developers, simplifying the development and deployment of service bundles by de-coupling the API used the service's specification from its implementations. The embodiments may support any variety of services, including web services, web application servers, web servers, etc. This model allows bundle developers to bind to services only using their interface specifications. The selection of a specific implementation, optimized for a specific need or from a specific vendor, can thus be deferred to run-time.

In the service layer 208, bundles are built around a set of cooperating services available from a shared service registry. Such services are defined semantically by its service interface and implemented as a service object. The service interface can be specified with as few implementation details as possible.

The service object is owned by, and runs within, a bundle. In one embodiment, this bundle must register the service object with the framework service registry so that the service's functionality is available to other bundles under control of the framework.

In one embodiment, the framework 114 manages dependencies between the bundle owning the service and the bundles using it. For example, when a bundle is stopped, all the services registered with the framework 114 by that bundle must be automatically unregistered. The framework 114 maps services to their underlying service objects, and provides a simple but powerful query mechanism that enables a bundle to request the services it needs. The framework 114 also provides an event mechanism so that bundles can receive events of services that are registered, modified, or unregistered.

In one embodiment, the security layer 210 defines a secure packaging format as well as the runtime interaction with the framework 114. In one embodiment, the security layer 210 is based on the X.509 v3 digital certificate model. A manifest for approved bundles contains the minimum required capabilities and authorizations. It may be digitally signed using a private key and is authenticated with the public key resident in device firmware. Digitally signing is a security feature that verifies the signer and ensures that the content has not been modified after it was signed by the principal. In one embodiment, the digital signing is based on public key cryptography. In one embodiment, the plugins running on the framework 114 are signed by a trusted entity, such as the manufacturer of the storage device 106. One or more of a variety of entities may sign the plugins to enhance the security and/or authentication of the plugins. In addition, a public key of one or more entities may be persistently stored on the storage device 106. For example, a public key may be burned into firmware of the controller 110. In one embodiment, an intermediate certificate installed on the storage device 106 comprises various metadata.

Figure 3:
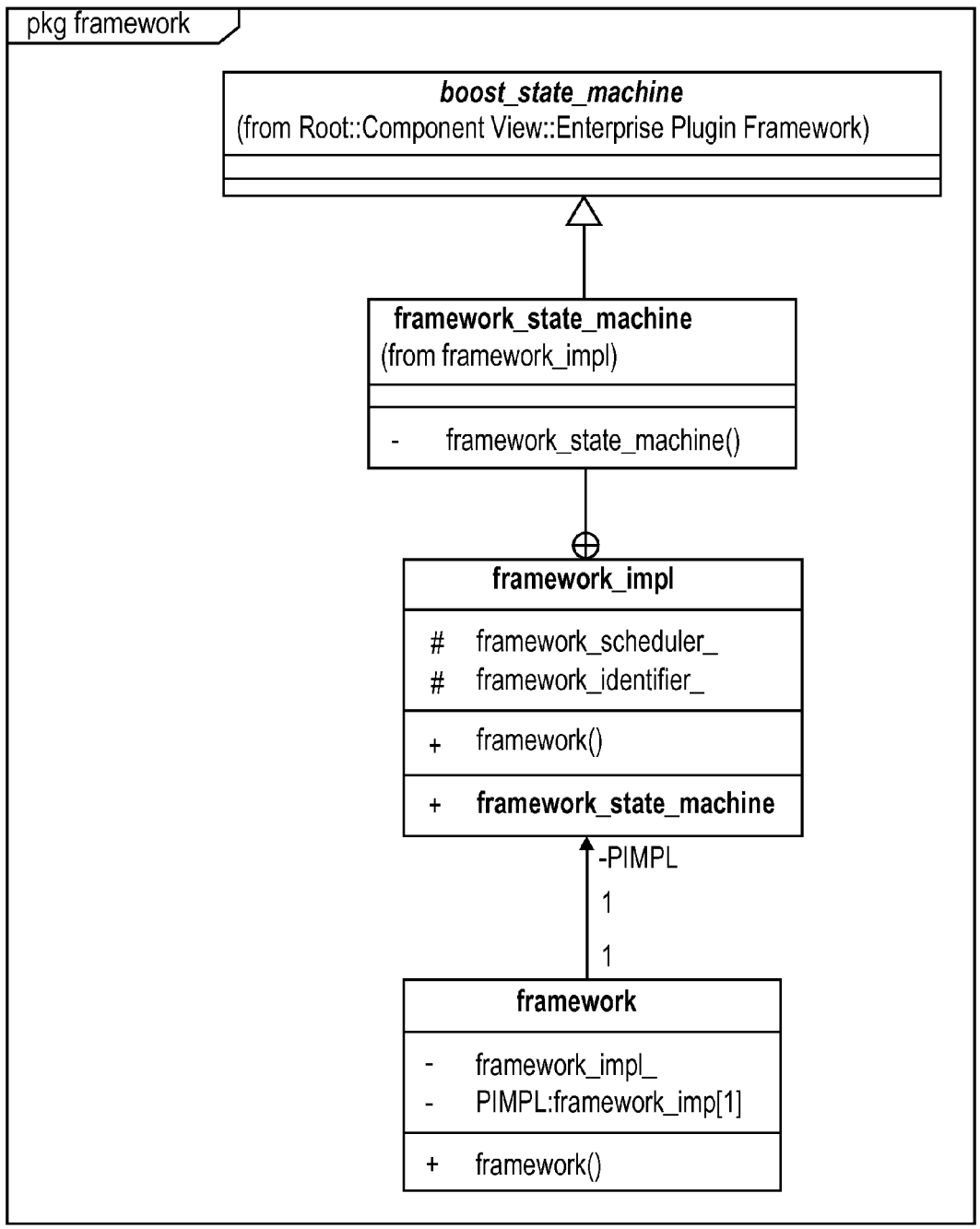
FIG. 3 illustrates exemplary structural elements of the framework in accordance with an embodiment of the present invention.

FIG. 3 illustrates exemplary structural elements of the framework in accordance with an embodiment of the present invention. The Framework forms the core of a general-purpose, secure and managed framework that supports the deployment of extensible and downloadable applications known as bundles. It may be implemented as a singleton and use a pointer to implementation (PIMPL) idiom to separate the implementation from the framework API description itself. Below are some exemplary descriptions of the structural elements of the framework.

Exemplary Framework API

```
std::vector< std::shared_ptr< bundle_t >> get_bundles( ): Returns a
vector of shared_ptr to all of the bundles currently installed in the
Framework;
std::shared_ptr< bundle_t > get_bundle( bundle_id_t ): Returns a
shared pointer to the bundle object specified by the unique identifier.
service_registration_t register_service
service_reference_t get_service_reference( std::string )
```

Figure 4:
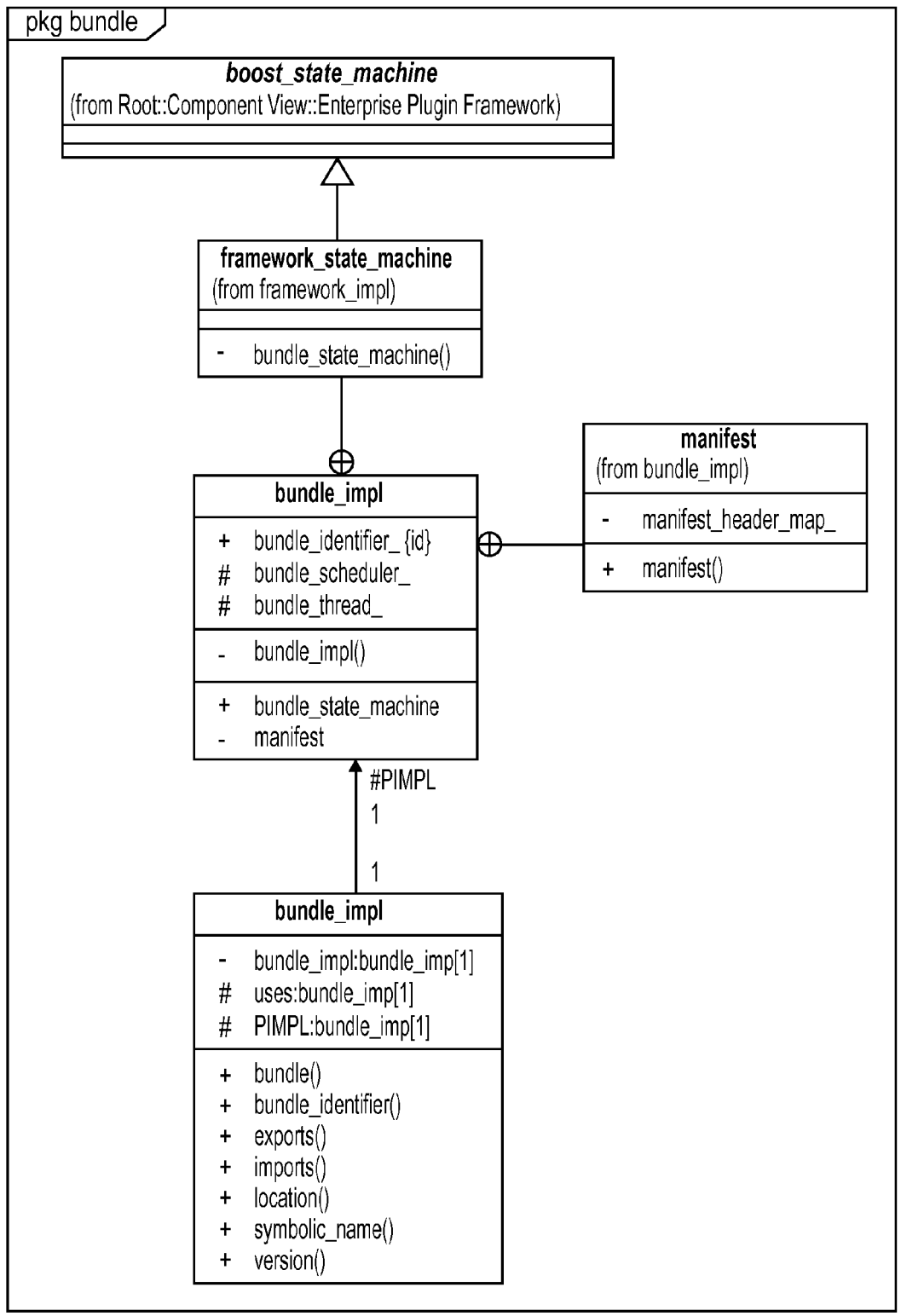
FIG. 4 illustrates an exemplary package.

FIG. 4 illustrates an exemplary package of bundles. Bundles are entities that are visible in normal application programming. An example is provided below.

```
bundle.std::shared_ptr< bundle_t > get bundle( ): Returns a
shared pointer to the bundle object.
bundle_identifier_t get_bundle_id( )
std::string get_symbolic_name( )
std::string get_vendor( )
bundle_version_t get_version( )
```

Manifests

Each bundle object contains a manifest object that provides access to the contents of the manifest file delivered as part of the bundle.

Exemplary Manifest API

```
const ::string & bundle_copyright( ).
const std::string& bundle_contact_address( ).
const std::string& bundle_license( ).
void parse_manifest( const std::string& path ).
void parse_manifest( boost::filesystem::filebuf infile ).
```

-continued

```
const std::string& bundle_name( ).
const std::string& symbolic_name( ).
const ::string& bundle_vendor( ).
manifest_version_t manifest_version( ).
std::vector< std::string > require_bundle( ): Returns a list of
required bundle symbolic-names with optional
attribute assertions.
std::vector< std::string > provide_capability( ): Specifies that
a bundle provides a set of capabilities in the
form of one or more named interfaces.
std::vector< std::string > require_capability( ): Specifies that
a bundle requires a set of capabilities in the
form of one or more named interfaces.
```

Figure 5:
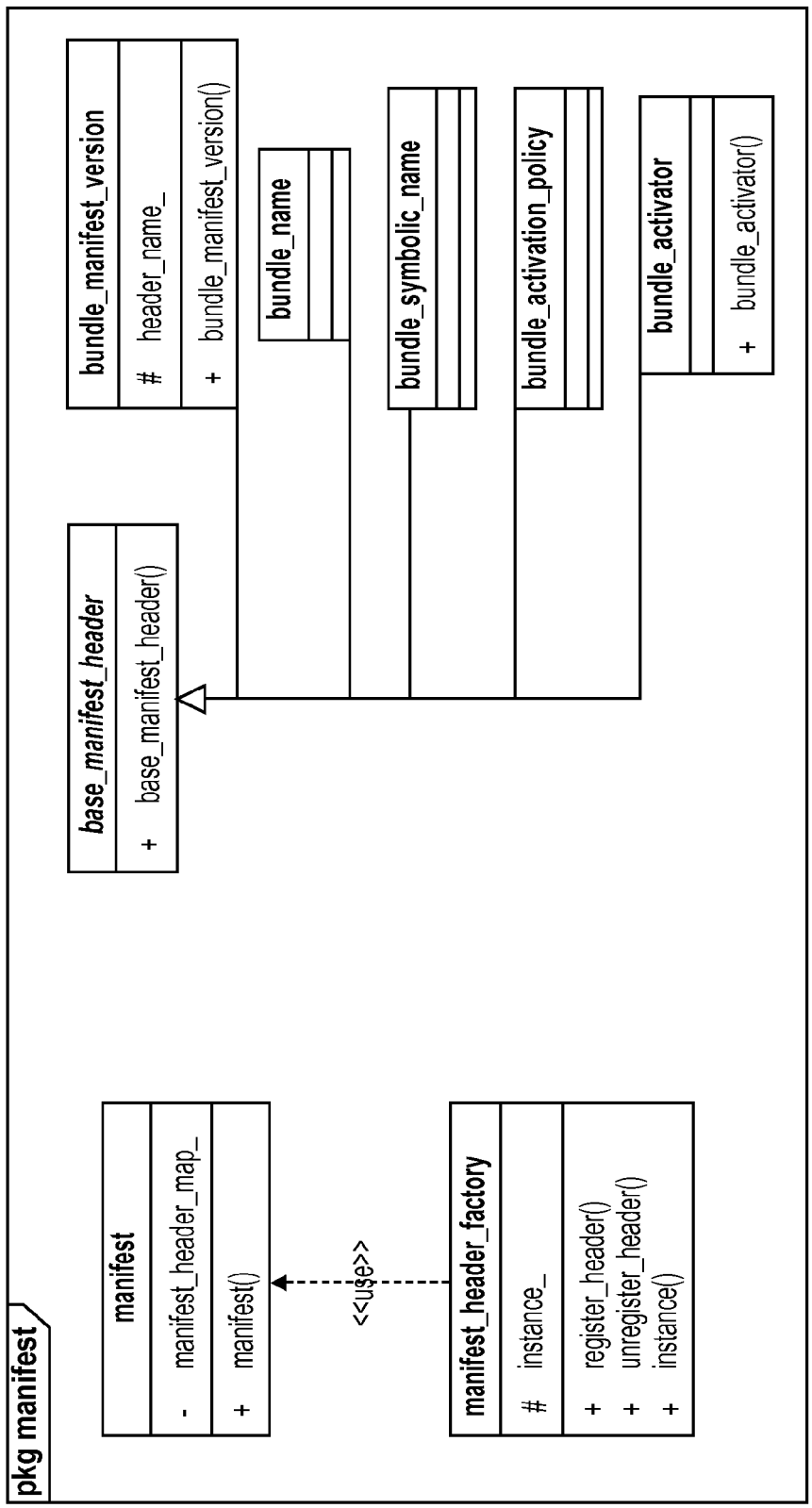
FIG. 5 illustrates an exemplary structure of a manifest and its headers.

FIG. 5 illustrates an exemplary structure of a manifest and its headers that may be used by the framework 114. A plugin bundle carries descriptive information about itself in the manifest file that is contained in the bundle archive, for example, under the name META-INF/MANIFEST.MF. In one embodiment, specified manifest headers are listed in the following sections.

| | |
|---|---|
| Manifest-Version | |
| Bundle-Activator | |
| Bundle-ContactAddress | |
| Bundle-Copyright | |
| Bundle-License | |
| Bundle-ManifestVersion | |
| Bundle-Name | |
| Bundle-SymbolicName | |
| Bundle-Vendor | |
| Bundle-Version | |
| Provide-Capability | |
| Require_Capability | |
| Require-Bundle | |
| Bundle-LinixCapabilities | The Bundle-Capabilities specifies which Linux capabilities will be granted to the plugin in the bundle.<br>Bundle-LinuxCapabilities := operation (';' operation)*<br>Operation := CAP_AUDIT_CONTROL; CAP_AUDIT_WRITE; CAP_CHOWN; CAP_DAC_OVERRIDE; CAP_DAC_READ_SEARCH; CAP_FOWNER; CAP_FSETID; CAP_IPC_LOCK; CAP_IPC_OWNER; CAP_KILL; CAP_LEASE; CAP_LINUX_IMMUTABLE; CAP_MAC_ADMIN; CAP_MAC_OVERRIDE; CAP_MKNOD; CAP_NET_ADMIN; CAP_NET_BIND_SERVICE; CAP_NET_ADMIN; CAP_NET_BIND_SERVICE; CAP_NET_BROADCAST; CAP_NET_RAW; CAP_SETGID; CAP_SETPCAP; CAP_SETUID; CAP_SYS_ADMIN; CAP_SYS_BOOT; CAP_SYS_CHROOT; CAP_SYS_MODULE; CAP_SYS_NICE; CAP_SYS_PACCT; CAP_SYS_PTRACE; CAP_SYS_RAWIO; CAP_SYS_RESOURCE; CAP_SYS_TIME; CAP_SYS_TTY_CONFIG<br>In one embodiment, the plugin is an executable, the Linux Capabilities may be applied to the process thread, otherwise to the file or files in combination with access control lists ("ACLs"). |

Manifest Header Factory

In one embodiment, the Manifest Header Factory class is implemented as a singleton. Its purpose is to instantiate specific manifest_header objects based on the manifest header name. This class enables polymorphic dispatch and, if new header types are required, they can be added without changing any existing code. An example is provided below.

Exemplary Manifest Header Factory API

```
static manifest_header_factory& instance( )
void register_header( )
Of note, every manifest header handler registers a function
void unregister_header( )
```

Figure 6:
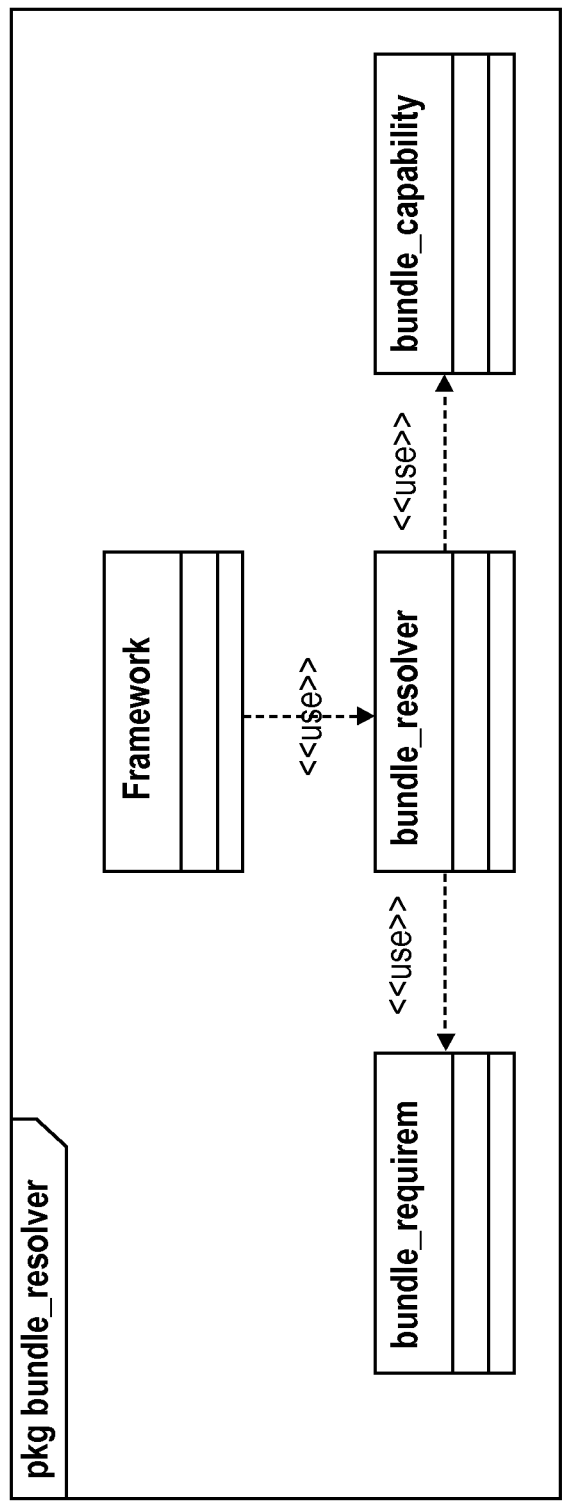
FIG. 6 illustrates an exemplary resolver used by the framework of one embodiment.

FIG. 6 illustrates an exemplary resolver used by the framework of one embodiment. The bundle resolver uses the bundle_requirement and bundle_capability information contained in the manifest headers to identify the 'best-fit' for any given bundle. In the event of 'unresolvable' conflicts, the resolver will create a renamed version of 'best' candidate, resolve it, and modify the original bundle dependencies in the elf to reflect the 'new' library name. The modified version of the bundle will then be loaded and destroyed on framework exit.

Figure 7:
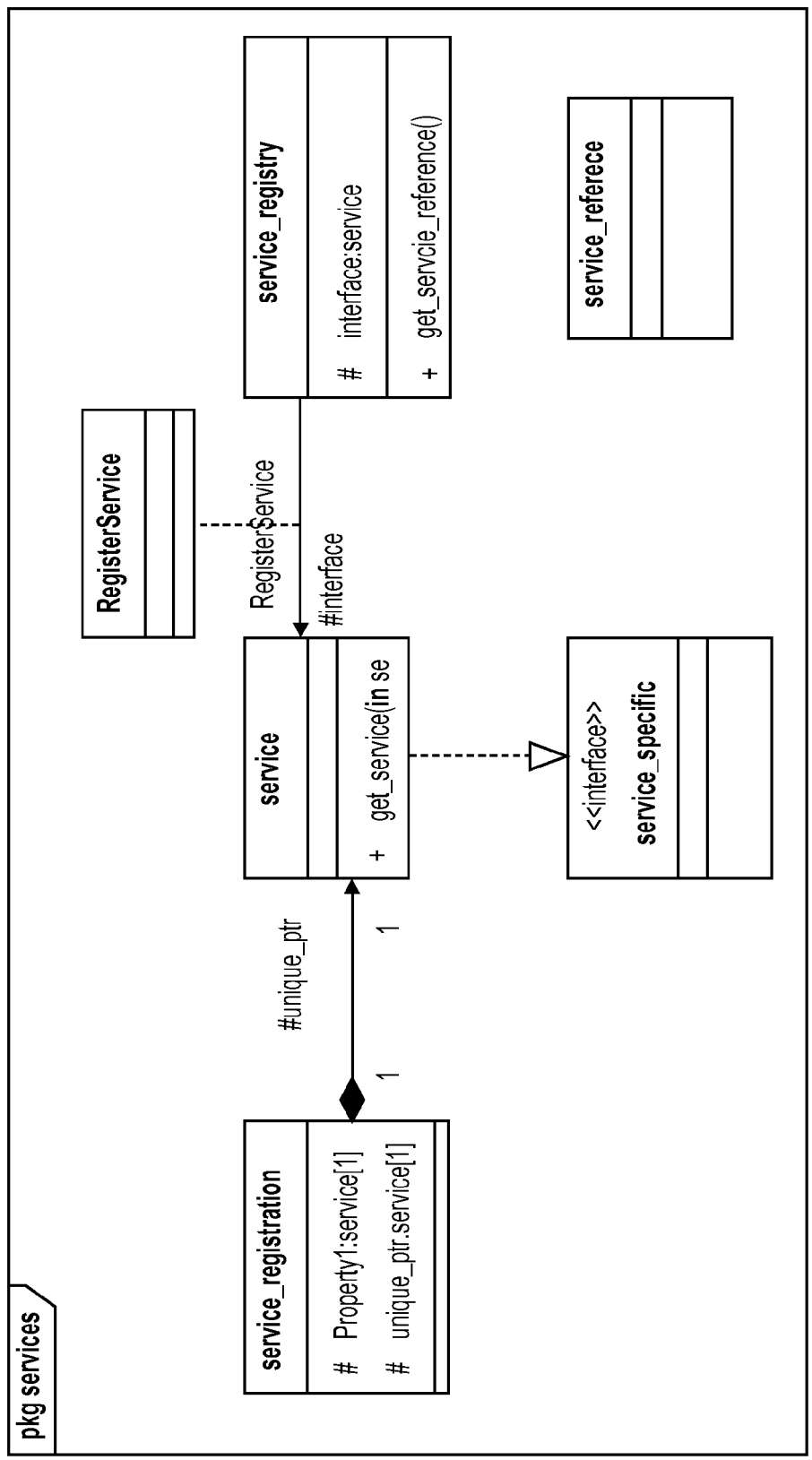
FIG. 7 illustrates an exemplary services object used by a framework of one embodiment of the present invention.

FIG. 7 illustrates an exemplary services object used by a framework of one embodiment of the present invention. The service object is owned by, and runs within a bundle. This bundle must register the service object with the Framework service registry so that the service's functionality is available to other bundles under control of the Framework.Services API. An example is provided below.

std::shared_ptr<?>get_service
        (shared_ptr<service_reference>)
    where Service Interfaces: is a service interface is the specification of the service's public methods.

Figure 8:
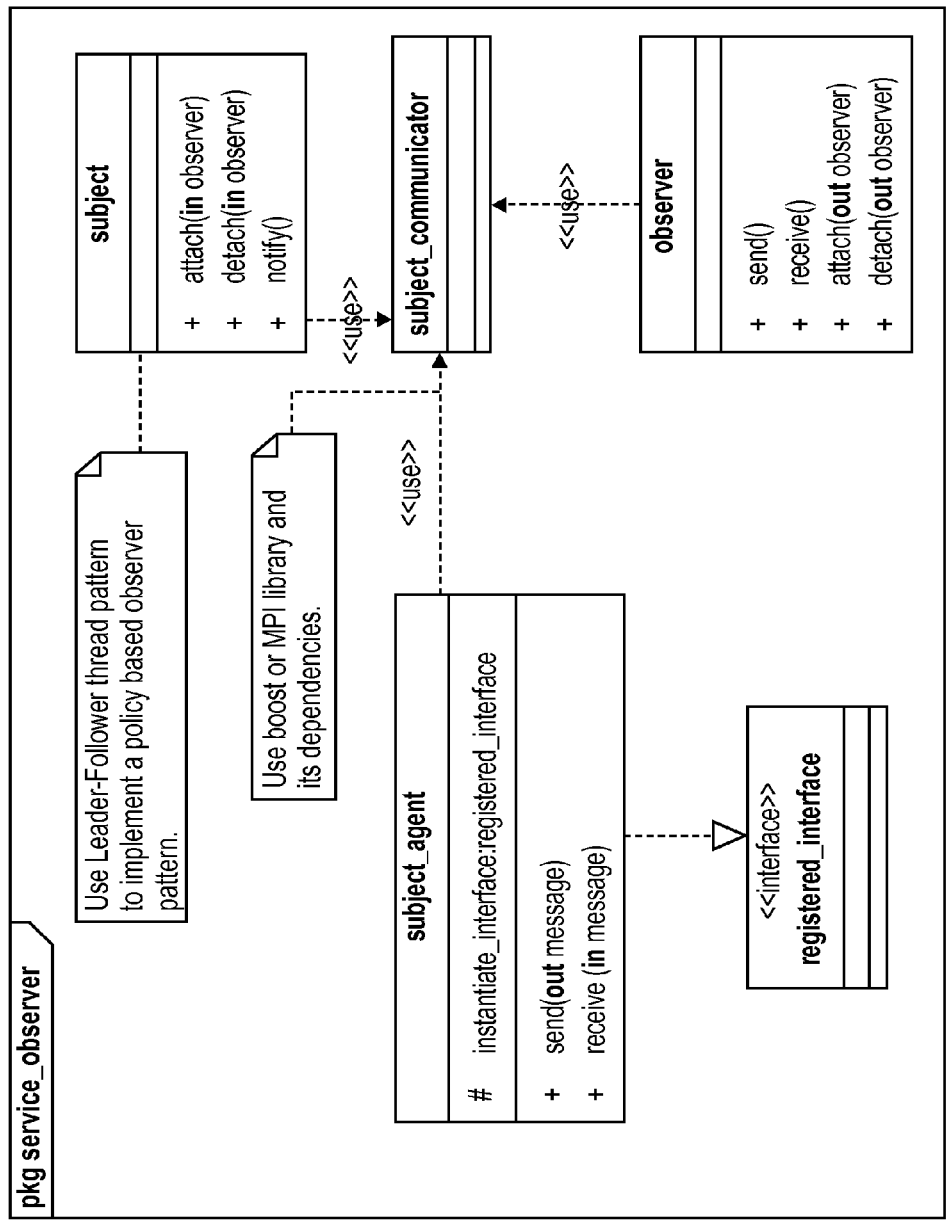
FIG. 8 illustrates an exemplary services observer used by a framework in one embodiment.

FIG. 8 illustrates an exemplary services observer used by a framework in one embodiment.

Figure 9:
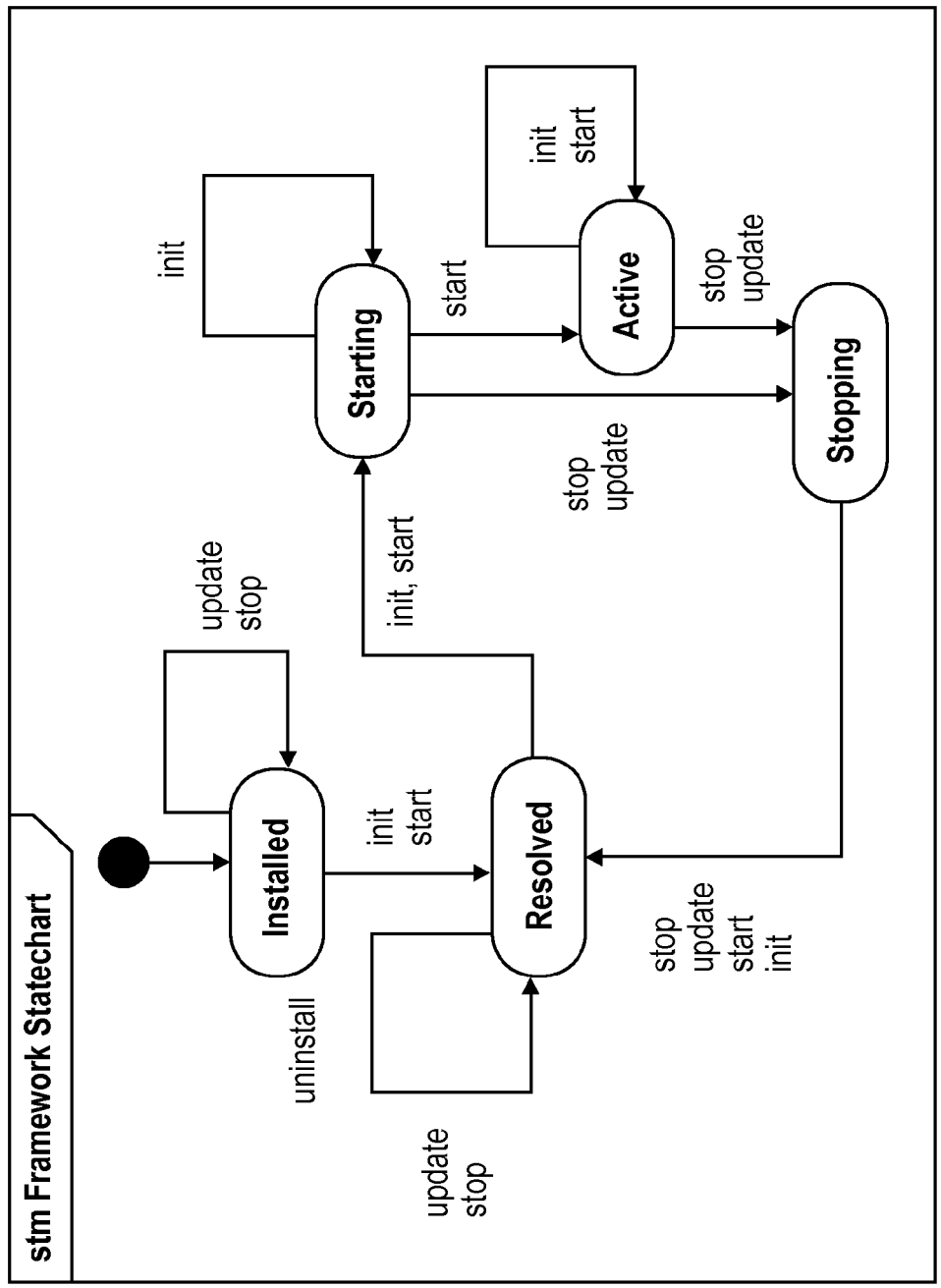
FIG. 9 illustrates an exemplary state chart of a framework in one embodiment.

FIG. 9 illustrates an exemplary statechart of a framework in one embodiment. Upon exiting the INSTALLED state the following actions may occur:
Event handling is enabled,
The security manager is configured,
Any installed bundle is in the INSTALLED state, and
Framework services are available,
Resolved State When the framework is in the RESOLVED state, it is operational but none of its bundles are active. As long as the framework is in this state, new bundles can be installed without any installed code interfering. Existing bundles must all be in the INSTALLED state. The framework_start event is required to move the framework to the STARTING state.

Alternatively, there may be one state where bundles are resolved and another where (during shutdown) resources previously constructed are destroyed before transitioning bask to the framework INSTALLED state.

Figure 10:
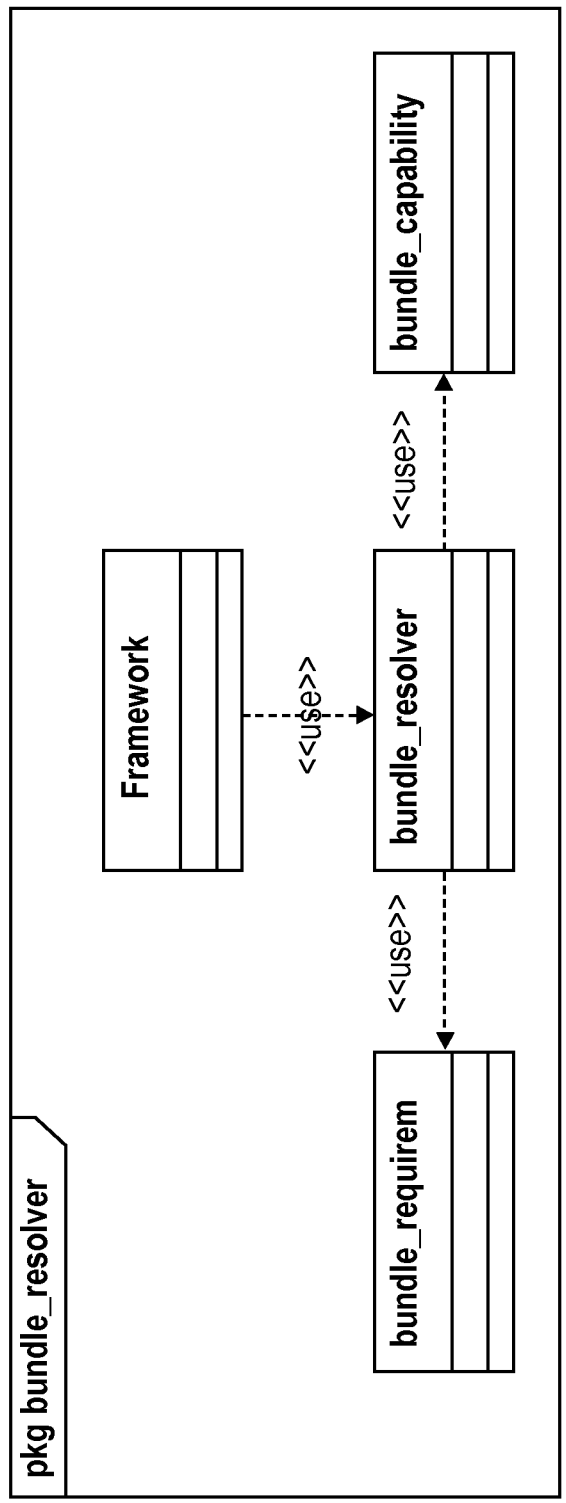
FIG. 10 illustrates an exemplary resolver used in a framework of one embodiment.

FIG. 10 illustrates an exemplary resolver used in a framework of one embodiment.
Starting In the STARTING state, the framework starts all the installed bundles. Once all the bundles have been started, the framework transitions to the ACTIVE state.
Active In the framework ACTIVE state, all installed bundles previously recorded as being started must be in the bundle ACTIVE state.
Stopping When the framework is shutdown, if first enters the framework STOPPING state where all bundles in the ACTIVE state are stopped. The framework then transitions to the RESOLVED state where resources are destroyed.

Figure 11:
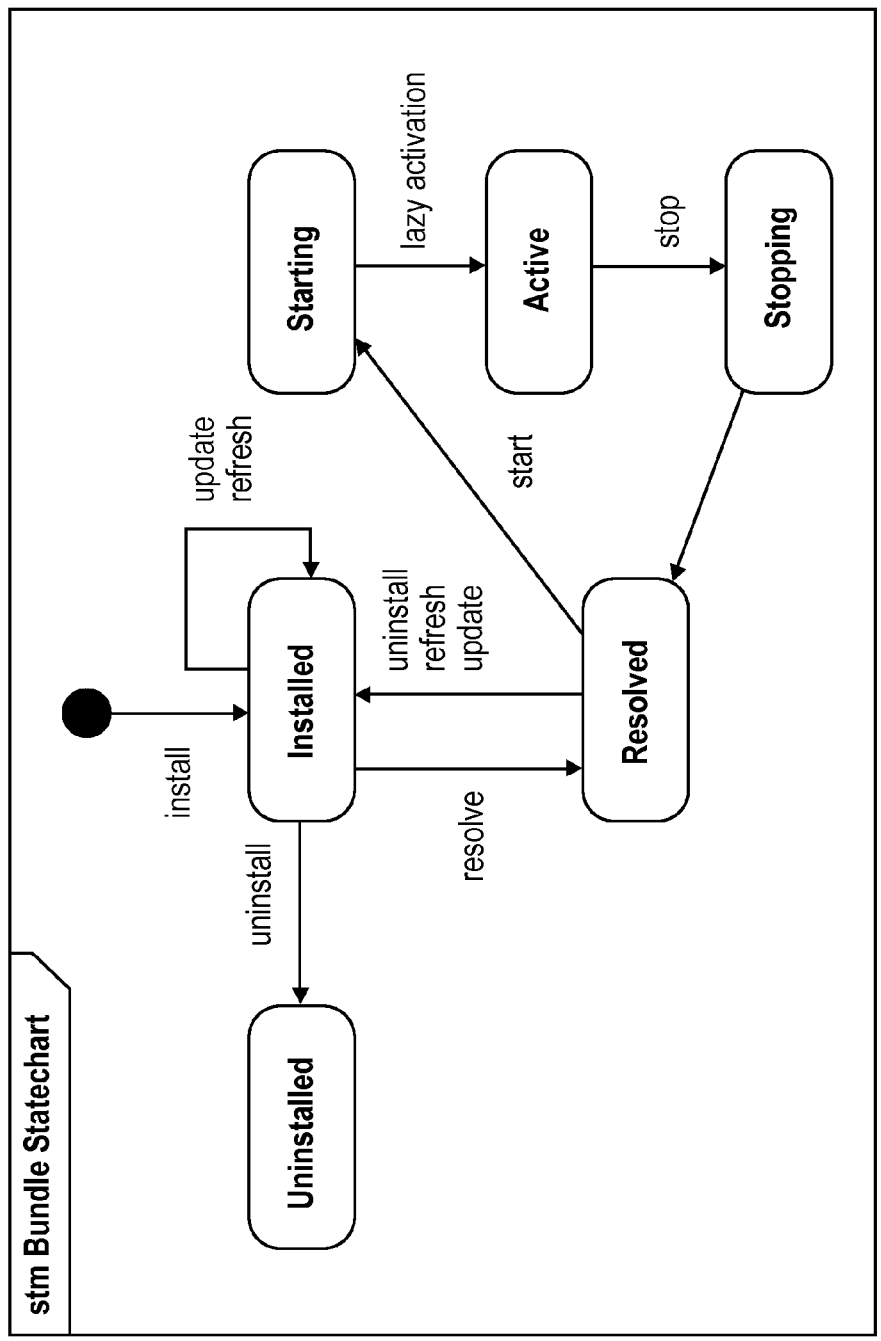
FIG. 11 illustrates an exemplary bundle state chart.

FIG. 11 illustrates an exemplary bundle state chart.
Installed

The bundle has been successfully installed. When a bundle is installed, it is stored in the persistent storage of the Framework and remains there until it is explicitly uninstalled. Whether a bundle has been started or stopped must be recorded in the persistent storage of the Framework. A bundle that has been persistently recorded as started must be started whenever the Framework starts until the bundle is explicitly stopped.
Resolved All classes that the bundle needs are available. This state indicates that the bundle is either ready to be started or has stopped.
Starting The bundle is being started. The bundle_activator.start method will have been called but has not yet returned.
Active The bundle has been successfully activated and is running. Its bundle_activator.start method has been called and has returned.
Stopping The bundle is being stopped. The bundle_activator.stop method has been called but the stop method has not yet returned.
Uninstalled The bundle has been uninstalled. It cannot move into another state.

Figure 12:
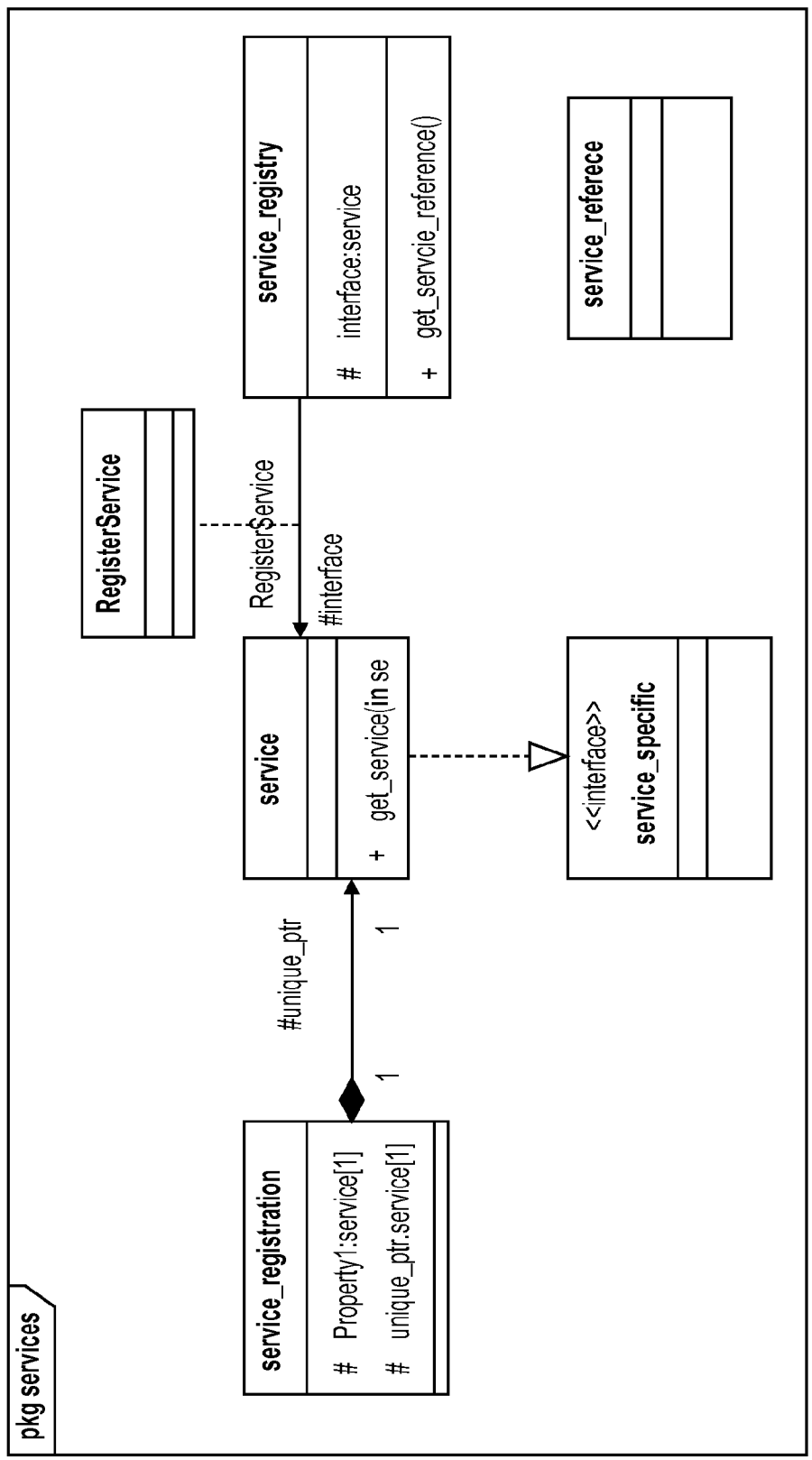
FIG. 12 illustrates an exemplary services object used in a framework of one embodiment.

FIG. 12 illustrates an exemplary services object used in a framework of one embodiment. A service may be defined semantically by its service interface[s] and implemented as a service object. Service interfaces are named and versioned and composed of operations.

The service object is owned by, and runs within, a bundle. This bundle must register the service object with the framework service registry so that the service's functionality is available to other bundles under control of the Framework.

Figure 13:
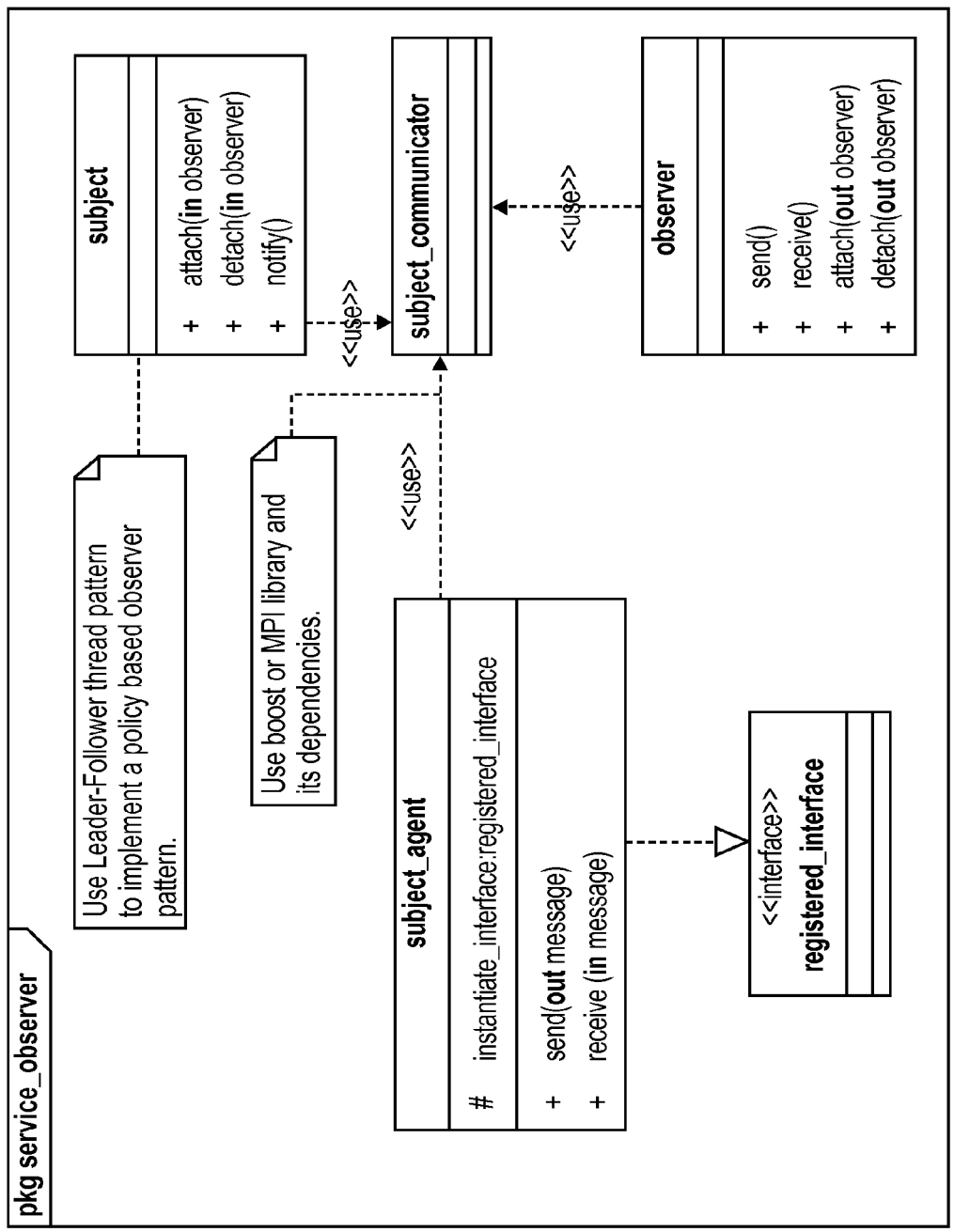
FIG. 13 illustrates an exemplary services observer object.

Dependencies between the bundle owning the service and the bundles using it are managed by the framework. The framework maps services to their underlying service objects using the resolver. The framework also provides an event mechanism so that bundles can receive events from services that are registered. FIG. 13 illustrates an exemplary services observer object.

The features and attributes of the specific embodiments disclosed above may be combined in different ways to form additional embodiments, all of which fall within the scope of the present disclosure. Although the present disclosure provides certain embodiments and applications, other embodiments that are apparent to those of ordinary skill in the art, including embodiments, which do not provide all of the features and advantages set forth herein, are also within the scope of this disclosure. Accordingly, the scope of the present disclosure is intended to be defined only by reference to the appended claims.

What is claimed is:

1. A method of controlling execution of program code on an embedded device via a framework, said method comprising:
receiving software modules on the embedded device into a directory indicated by a pointer configured in the framework, wherein the software modules are written in one of an interpreted program code and
a program code native to a hardware platform of the embedded device;
authenticating, by the framework, the software modules;
determining a set of permissions to the software modules based on the authentication;
verifying dependencies of the software modules needed for execution of the software modules;
compiling the software modules into program code that is executable on the hardware platform of the embedded device; and
controlling, by the framework, execution of the software modules, wherein the framework provides interoperability between software modules written in interpreted program code and software modules written in native program code.

2. The method of claim 1, wherein the embedded device is a network attached storage.

3. The method of claim 1, wherein authenticating the software modules comprises authenticating the software modules based on a digital signature.

4. The method of claim 1, wherein determining the set of permissions comprises determining the set of permissions based on a digital certificate indicated by a manifest for the software modules.

5. The method of claim 1, wherein determining dependencies of the software modules comprises determining a dependency on a native program code library based on a header provided in the software modules and a manifest for the software modules.

6. The method of claim 1, wherein controlling execution of the software modules comprises controlling execution of a software module written in the native program code.

7. The method of claim 1, wherein controlling execution of the software modules comprises controlling execution of a software module written in C++.

8. An embedded device configured to control execution of program code via a framework implementing a framework, the embedded device comprising:
   storage;
   a controller coupled to the storage, the controller being configured to:
      receive software modules into a directory indicated by a pointer configured in the framework, the software modules being written in one of an interpreted program code and a program code native to a hardware platform of the embedded device;
      authenticate the software modules using the framework;
      determine a set of permissions to the software modules based on the authentication;
      verify dependencies of the software modules needed for execution of the software modules;
      compile the software modules into program code that is executable on the hardware platform of the embedded device; and
      control, using the framework, execution of the software modules, wherein the framework provides interoperability between software modules written in interpreted program code and software modules written in native program code.

9. The embedded device of claim 8, wherein the embedded device comprises a network attached storage.

10. The embedded device of claim 8, wherein the controller is configured to authenticate the software modules based on a digital signature.

11. The embedded device of claim 8, wherein the controller is further configured to determine the set of permissions based on a digital certificate indicated by a manifest for the software modules.

12. The embedded device of claim 8, wherein the controller is further configured to determine dependencies by determining a dependency on a native program code library based on a header provided in the software modules and a manifest for the software modules.

13. The embedded device of claim 8, wherein the controller is further configured to control execution of a software module written in the native program code.

14. The embedded device of claim 8, wherein the controller is further configured to control execution of a software module written in C++.

* * * * *